United States Patent
Knoeppel et al.

(10) Patent No.: US 8,691,914 B2
(45) Date of Patent: Apr. 8, 2014

(54) HIGH IMPACT POLYSTYRENE WITH HIGH GLOSS AND HIGH IMPACT STRENGTH

(75) Inventors: David W. Knoeppel, League City, TX (US); Likuo Sun, Houston, TX (US); Jon Tippet, League City, TX (US)

(73) Assignee: Fina Technology, Inc., Houston, TX (US)

( * ) Notice: Subject to any disclaimer, the term of this patent is extended or adjusted under 35 U.S.C. 154(b) by 11 days.

(21) Appl. No.: 13/445,914

(22) Filed: Apr. 13, 2012

(65) Prior Publication Data

US 2012/0289656 A1 Nov. 15, 2012

Related U.S. Application Data

(60) Provisional application No. 61/485,496, filed on May 12, 2011.

(51) Int. Cl.
- *C08L 53/02* (2006.01)
- *C08L 25/06* (2006.01)
- *C08L 9/06* (2006.01)
- *C08L 51/04* (2006.01)

(52) U.S. Cl.
USPC .............................................. 525/71; 525/86

(58) Field of Classification Search
USPC ..................................................... 525/71, 86
See application file for complete search history.

(56) References Cited

U.S. PATENT DOCUMENTS

| | | |
|---|---|---|
| 4,239,859 A | 12/1980 | Miller |
| 4,524,180 A | 6/1985 | Sun |
| 6,329,459 B1 | 12/2001 | Kang et al. |
| 6,380,305 B1 | 4/2002 | Sheu |
| 2007/0208099 A1 * | 9/2007 | Herr et al. ....................... 522/40 |

FOREIGN PATENT DOCUMENTS

EP 1270665 A1 1/2003

OTHER PUBLICATIONS

Z. Jelcic, et al.; "Mechanical Properties and Fractal Morphology of High-Impact Polystyrene/Poly(styrene-b-Butadiene-b-Styrene) Blends"; Polymer Degradation and Stability, vol. 90, Issue 2, pp. 295-302; Nov. 2005.

* cited by examiner

*Primary Examiner* — Jeffrey Mullis

(57) ABSTRACT

A high impact polystyrene (HIPS) is made from styrene monomer and 3 to 20 wt % of an elastomeric component phase including polybutadiene rubber and styrene butadiene copolymer. The HIPS has a 60 degree gloss of 90 or more, a Gardner drop of at least 10 in-lb, and an Izod impact strength of 1.8 ft-lb/in or more. The HIPS can have salami morphology with rubber particle size between 1 and 1.3 microns.

19 Claims, 1 Drawing Sheet

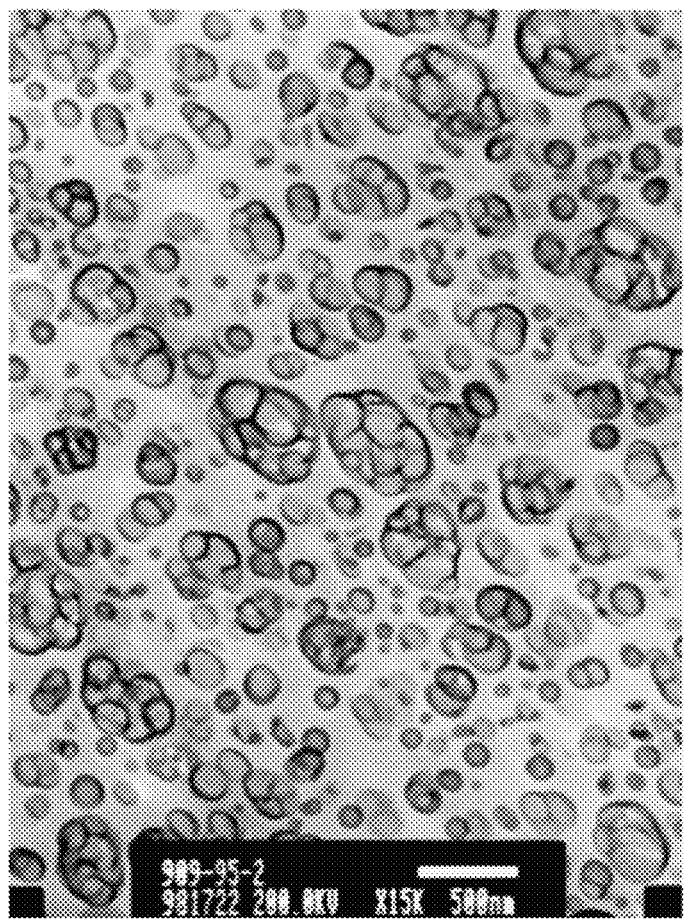

HIGH IMPACT POLYSTYRENE WITH HIGH GLOSS AND HIGH IMPACT STRENGTH

CROSS-REFERENCE TO RELATED APPLICATIONS

This application claims priority to U.S. Provisional Patent No. 61/485,496 filed on May 12, 2011.

FIELD

The present invention generally relates to high impact polystyrene with high gloss and impact properties.

BACKGROUND

Polystyrene that has been polymerized with an amount of rubber, such as polybutadiene (PB), can be termed high impact polystyrene, or HIPS. The addition of polybutadiene increases the polymer's toughness and impact absorption.

The mechanical, optical and other properties of HIPS are greatly influenced by rubber particle size (RPS) and morphology. For instance, large rubber particles increase the toughness of HIPS, while small rubber particles increase hardness and gloss. Certain applications, such as cap layers for linings in refrigerators and other appliances, require HIPS with both high gloss and high impact strength.

Styrene butadiene (SB) copolymers can be combined with conventional HIPS formulations. For example, a portion of the polybutadiene used in HIPS synthesis can comprise diblock SB and/or triblock SBS rubbers, which are styrene butadiene copolymers.

SB copolymers, when included in a HIPS polymerization, tend to decrease RPS and lead to core-shell morphology, whereas polybutadiene rubber leads to larger RPS and cell or salami structure. Thus, altering the relative amounts and type of both PB and SB copolymers in a HIPS composition can affect the composition's RPS and morphology, and in turn affect important physical properties like impact absorption and gloss.

Prior art approaches generally have involved bimodal RPS distribution, in which a combination of small rubber particles and larger rubber particles impart to the HIPS both the characteristics of high gloss and high impact absorption. Different RPS distributions correspond to different morphologies. For instance, larger RPS, between 0.5 and 10 microns, generally shows a cellular or salami morphology, which is characterized by cells of rubber dispersed in the polystyrene matrix wherein each rubber cell has multiple occlusions of polystyrene either partly or completely trapped within the rubber cell. Smaller RPS, from about 0.1 to 0.5 micron, is usually characterized with capsule, core-shell, or dot morphology.

There exist a great variety of SB copolymers that vary in molecular weight, ratio of styrene to butadiene, and other features, all of which can influence a HIPS composition differently. Furthermore, varying kinds of PB rubber, altering amounts of PB and SB copolymers used in a HIPS composition, and adjusting amounts of other additives and reactions conditions all influence the physical properties of HIPS. Thus, an ongoing need exists for novel HIPS compositions that possess certain physical properties tailored to meet a specific end-use. The present invention is directed towards a novel HIPS composition and process for making the same that has both high gloss and high impact absorption.

SUMMARY

In an embodiment, the present invention is for a high impact polystyrene composition containing at least 70 wt % styrene and from 3 to 20 wt %, optionally from 8 to 16 wt %, of an elastomeric component, wherein the elastomeric component contains polybutadiene and styrene butadiene copolymer.

In an embodiment, the polybutadiene and styrene butadiene copolymer are used in a PB:SB copolymer ratio of from 1:0.3 to 1:2.5. In an embodiment, the polybutadiene and styrene butadiene copolymer are used in a PB:SB copolymer ratio of from 2.5:1 to 0.4:1, optionally from 2:1 to 0.5:1, optionally about 1:2. In an embodiment, the styrene butadiene copolymer is a diblock copolymer comprising from 15 to 45 wt % styrene and from 10 to 35 wt % styrene present as styrene block. In another embodiment, the styrene butadiene copolymer is a triblock copolymer comprising from 30 to 40 wt % styrene block.

In an embodiment, the high impact polystyrene displays a single predominant morphology, which is cell or salami morphology. In an embodiment, the average rubber particle size is from 0.8 to 1.5 microns (μm), optionally from 1 to 1.3 microns and can have a monomodal distribution. In an embodiment, the average rubber particle span can be less than 1.

In an embodiment, the HIPS composition has an Izod impact strength of at least 1.8 ft-lbs/in. In another embodiment, the HIPS composition has an Izod impact strength of at least 2.0 ft-lbs/in. In another embodiment, the HIPS composition has an Izod impact strength of at least 2.3 ft-lbs/in. In an embodiment, the gloss at 60 degrees is at least 90, the gloss at 20 degrees is at least 60. In an embodiment, the Gardner drop is at least 10 in-lb. In another embodiment, the Gardner drop is at least 50 in-lb. In a further embodiment, the Gardner drop ranges from 150 to 350 in-lb. In an embodiment, the elongation at break ranges from 50 to 90%.

In an embodiment, the HIPS further includes from 100 to 500 ppm of a chain transfer agent.

According to another embodiment, the present invention is for a method for making HIPS, including the steps of: combining 70 to 95 wt % styrene monomer and 10 to 16 wt % of an elastomeric component in a polymerization reactor; polymerizing the mixture of styrene monomer and elastomeric component in the presence of from 150 to about 600 ppm by weight of a polymerization initiator and from 100 to about 500 ppm by weight of a chain transfer agent and under agitation conditions sufficient to provide salami morphology rubber particles with average rubber particle size of from 1 to 1.3 micron; and recovering a HIPS product with a 60 degree gloss of at least 90, a Gardner drop of at least 10 in-lb, and an Izod impact strength of at least 1.8 ft-lb/in. The elastomeric component comprises polybutadiene and styrene butadiene copolymer.

The various embodiments of the present invention can be joined in combination with other embodiments of the invention and the listed embodiments herein are not meant to limit the invention. All combinations of embodiments of the invention are enabled, even if not given in a particular example herein.

BRIEF DESCRIPTION OF DRAWINGS

FIG. 1 TEM image of HIPS composition described in Example 4.

DETAILED DESCRIPTION

The present invention is directed towards a high impact polystyrene (HIPS) composition possessing good gloss and good impact absorption properties. The HIPS has a polystyrene matrix and a rubbery dispersed phase that contains a combination of polybutadiene (PB) rubber and styrene butadiene (SB) copolymer. The invention is also directed towards the making of a HIPS composition, wherein a mixture of styrene monomer, polybutadiene rubber and styrene butadiene copolymer are polymerized to form a composition possessing good gloss and good impact absorption properties.

The polystyrene matrix makes up the major portion of the HIPS composition and is composed of chains of styrene monomer. One or more styrene compounds are used as monomers for the formation of the HIPS composition. Similar vinylidene aromatic monomers may be substituted in whole or in part for styrene. Such monomers include a variety of substituted styrenes (e.g., α-methyl styrene), ring-substituted styrenes such as p-methylstyrene, disubstituted styrenes, and unsubstituted styrenes. Styrene monomer makes up at least 70 wt % of the reactant feed for HIPS production.

The reaction mixture used to prepare HIPS contains rubber, or other elastomeric component, in amounts of from about 3 to 20 wt %, optionally from about 8 to 20 wt %, optionally from about 10 to 16 wt %. The rubber can be polybutadiene and/or styrene butadiene copolymer. In a desirable embodiment, the rubber is a combination of PB and SB copolymer. PB and SB copolymer can be used in a PB:SB copolymer ratio of about from 1:0.3 to 1:2.5. In some embodiments, the PB:SB copolymer ratio is from about 1:1.6 to 1:2.5. In another embodiment, the polybutadiene and styrene butadiene copolymer are used in a PB:SB copolymer ratio of from 2.5:1 to 0.4:1, optionally from 2:1 to 0.5:1, optionally about 1:2. An advantage of the present invention is that a relatively small amount of rubber can be used. PB rubber, and even more so SB copolymer, can be expensive and make HIPS production less economical.

The polybutadiene rubber can be any suitable form of polybutadiene. Other conjugated diene monomers can be substituted in whole or in part for the polybutadiene. Such optional rubber monomers include isoprene, for example.

The SB copolymer can be any copolymer made up of polystyrene and polybutadiene, such as styrene-butadiene-rubber (SBR). In an embodiment, the styrene butadiene copolymer is a block copolymer, either diblock, triblock, or some combination thereof. The SB copolymer can contain from about 15 wt % to about 45 wt % styrene, and can contain from 10 to 35 wt % styrene present as styrene block. Generally, greater amounts of styrene within the SB copolymer produce a composition with smaller RPS. The SB copolymer can be a tapered block copolymer.

A chain transfer agent, such as n-dodecyl mercaptan (NDM), can be present in the composition in the amount of from 100 ppm to 1000 ppm, optionally from 100 ppm to 750 ppm, optionally from 100 ppm to 500 ppm. In an embodiment, the chain transfer agent is selected from the group of mercaptans, thiols, and halocarbons and combinations thereof. Adjusting the amount of chain transfer agent can help to fine-tune the RPS and morphology by adjusting the viscosity ratio of the polybutadiene and polystyrene phases.

Other conventional additives can be present in the HIPS composition. Examples of additives include without limitation stabilizers, chain transfer agents, talc, antioxidants, UV stabilizers, lubricants, plasticizers, ultra-violet screening agents, oxidants, anti-oxidants, anti-static agents, ultraviolet light absorbents, fire retardants, processing oils, mold release agents, coloring agents, pigments/dyes, fillers, and the like. In an embodiment mineral oil can be present in the feed in an amount of from 0.1 to 5 wt %.

The HIPS can have an RPS of from 0.5 to 1.5 microns, optionally from 0.8 to 1.5 microns, optionally from 1 to 1.3 microns. The HIPS can have a rubber particle span, or RPS span, of less than 1. A narrower RPS span can increase gloss and physical properties. A typical RPS span for HIPS is >1.2.

The HIPS can have cell or salami morphology, a structure in which a plurality of styrenic resin phases are confined within one rubber particle, and the styrenic resin phases are partitioned from each other by the rubber phase. In embodiments, the cell or salami morphology is characterized by three or more polystyrene occlusions within a single rubber cell. Larger cell sizes can increase impact absorption and other desirable physical properties. By increasing the occlusion size without rupturing the rubber cell, rubber efficiency can be increased, making HIPS more economical.

The HIPS composition of the present invention has demonstrated improved properties over prior HIPS compositions. For instance, Polystyrene 620 is a high impact polystyrene formerly commercially available from Total Petrochemicals USA, Inc. Select properties of Polystyrene 620 are provided for in Table 1, below:

TABLE 1

| Polystyrene 620 properties | | |
| --- | --- | --- |
| Property | ASTM Test | Typical Value |
| Gardner Dart, in-lb | D-3029 | 4 |
| Izod Impact-Notched, ft-lbs/in | D-256 | 0.6 |
| Tensile Strength, psi | D-638 | 4,700 |
| Tensile Modulus, psi ($10^5$) | D-638 | 3.2 |
| Elongation, % | D-638 | 35 |
| Flexural Strength, psi | D-790 | 8,500 |
| Flexural Modulus, psi ($10^5$) | D-790 | 3.4 |
| Heat Distortion, ° F. Annealed | D-648 | 190 |
| Vicat Softening, ° F. | D-1525 | 209 |
| Melt Flow, g/10 min. at 200° C., 5.0 kg | D-1238 | 4.0 |
| Gloss, 60° | D-523 | 100 |
| Gloss, 20° | D-523 | 62 |

The HIPS composition of the present invention can have both high gloss and high impact absorption. The HIPS can have a gloss of at least 85, optionally at least 90, when measured at 60 degrees, and a gloss of at least 60, optionally at least 70, when measured at 20 degrees. The Izod impact strength can be at least 1.5 ft-lb/in, optionally at least 1.8 ft-lb/in, optionally at least 2.0 ft-lb/in, optionally at least 2.3 ft-lb/in. In an embodiment, the HIPS composition has a Gardner drop of at least 10 in-lb. In another embodiment, the HIPS composition has a Gardner drop of at least 50 in-lb. In yet another embodiment, the HIPS composition has a Gardner drop of at least 100 in-lb. In an alternative embodiment, the HIPS composition has a Gardner drop ranging from 50 to 500 in-lb. In yet another alternative embodiment, the HIPS composition has a Gardner drop ranging from 150 to 350 in-lb. In a further embodiment, the HIPS composition has a Gardner drop ranging from 200 to 300 in-lb.

The HIPS can have a Mw of less than 300,000 Daltons. In an embodiment, the HIPS can have a Mw of less than 200,000 Daltons. In another embodiment, the HIPS can have a Mw ranging from 50,000 to 350,000 Daltons. In yet another embodiment, the HIPS can have a Mw ranging from 100,000 to 250,000 Daltons. In a further embodiment, the HIPS can have a Mw of from 150,000 to 200,000 Daltons and a Mn of from about 50,000 to 100,000 Daltons.

The HIPS can also have improved ductile properties and increased elongation as compared to Polystyrene 620, for example. The HIPS can have a flexural modulus ranging from 200,000 to 400,000 psi, optionally from 250,000 to 350,000, optionally from 275,000 to 325,000 psi. The HIPS can have a flexural strength ranging from 2,000 to 10,000 psi, optionally from 5,000 to 8,000 psi, optionally from 6,000 to 7,000 psi. The HIPS can have a tensile modulus ranging from 150,000 to 350,000 psi, optionally from 200,000 to 300,000 psi, optionally from 225,000 to 275,000 psi. The HIPS can have a tensile strength at break ranging from 1,000 to 10,000 psi, optionally from 2,000 to 5,000 psi, optionally from 2,500 to 4,000 psi. The HIPS can have an elongation at break ranging from 25 to 95%, optionally from 50 to 90%, optionally from 65 to 80%.

The HIPS composition can be used to produce an end-use article. In an embodiment, the articles include films, sheets and thermoformed or foamed articles. For example, a final article may be thermoformed from a sheet containing the HIPS composition. In an embodiment, an article can be obtained by subjecting the HIPS composition to a plastics shaping process such as blow molding, extrusion, injection blow molding, injection stretch blow molding, thermoforming, and the like. The HIPS composition may be formed into end use articles including food packaging, office supplies, plastic lumber, replacement lumber, patio decking, structural supports, laminate flooring compositions, polymeric foam substrate, decorative surfaces, outdoor furniture, point-of-purchase signs and displays, housewares and consumer goods, building insulation, cosmetics packaging, outdoor replacement materials, lids and food/beverage containers, appliances, utensils, electronic components, automotive parts, enclosures, protective head gear, medical supplies, toys, golf clubs and accessories, piping, business machines and telephone components, shower heads, door handles, faucet handles, and the like.

In an embodiment, the present invention is a method for making HIPS that has good gloss and good impact absorption. The steps include combining 70 to 95 wt % styrene monomer and 7 to 16 wt % of an elastomeric component in a polymerization reactor; polymerizing the mixture of styrene monomer and elastomeric component in the presence of from 150 to about 600 ppm by weight of a polymerization initiator and from 100 to about 500 ppm by weight of a chain transfer agent and under agitation conditions sufficient to provide salami morphology rubber particles with average rubber particle size of from 1 to 1.3 micron, and recovering a HIPS product with a 60 degree gloss of at least 90, a Gardner drop of at least 10 in-lb, and an Izod impact strength of at least 1.8 ft-lb/in. The elastomeric component can be a combination of polybutadiene rubber and styrene butadiene block copolymer. Styrene monomer, PB, and SB copolymer can be any type disclosed herein.

The polymerization step can include conventional HIPS reactors and reaction conditions. The HIPS polymerization process can be either batch or continuous. In an embodiment, the polymerization reaction may be carried out using a continuous production process in a polymerization apparatus including a single reactor or a plurality of reactors. Reactors and conditions for the production of a polymeric composition are disclosed in U.S. Pat. No. 4,777,210, which is incorporated by reference herein in its entirety. The temperature range for the polymerization can be from 90° C. to 240° C. In another embodiment, the temperature range for the polymerization can be from 100° C. to 180° C. In yet another embodiment, the polymerization reaction may be carried out in a plurality of reactors with each reactor having an optimum temperature range. The HIPS product can be devolatilized by a process including passing the HIPS through a devolatilizer (DV).

Any conventional initiator capable of free radical formation that facilitates the polymerization of styrene may be employed, for example, Luperox L233 and L531 available from Arkema. Initiators can be used in an amount of from 100 ppm to 1000 ppm, optionally from 150 ppm to 600 ppm. Chain transfer agents, such as NDM can be added in the amount of from 100 ppm to 1000 ppm, optionally from 100 ppm to 500 ppm, either in the feed or at any point during polymerization. The speed of agitators used in one or more reactors can be adjusted to fine tune RPS of the HIPS product. In particular, the agitation speed in the one or more reactors in which phase inversion occurs can be altered to help control the RPS of the HIPS product.

EXAMPLES

The following examples are meant to be merely illustrative of particular embodiments of the present invention, and are by no means limiting of the scope of the invention.

Example 1

Several samples of HIPS composition were produced and tested for impact strength and gloss. The feed included styrene monomer and 12 wt % rubber. 180 ppm of an initiator, a blend of L531 and L233 in a L531:L233 ratio of 2:1, was used, as well as 200 ppm NDM. The rubber phase included polybutadiene rubber and SB copolymer. PB rubber was either Buna CB 565 or Buna CB 380, commercially available from Lanxess. The SB copolymer was either Stereon 730AC from Firestone, containing 30 wt % styrene, Asahi 670A, containing 39 wt % styrene. The following table lists the rubber packages used in each of the experimental samples, as well as results for Izod impact absorption, gloss, and gloss retention.

TABLE 2

Rubber packages and physical properties for compositions of Example 1.

| Sample | Rubbers Composition | RPS, microns | Gloss, 20° | Gloss, 60° | % Gloss retention at 120° C. | % Gloss retention at 150° C. | Notched Izod Impact, ft-lb/in |
|---|---|---|---|---|---|---|---|
| EX1 A | 4% 565, 8% 730 | 1.22 | 84.8 | 97.1 | 90.3 | 24.7 | 2.19 |
| EX1 B | 4% 565, 8% 670 | 1.14 | 87.8 | 97 | 92.8 | 32.2 | 1.52 |
| EX1 C | 4% 565, 4% 730, 4% 670 | 1.18 | 80.1 | 94 | 88.9 | 28.8 | 1.8 |
| EX1 D | 8% 565, 4% 730 | 1.2 | 81.8 | 95.6 | 79.4 | 18.6 | 2.26 |
| EX1 E | 4% 380, 8% 730 | 1.5 | 94.3 | 95.4 | 73.9 | 18.2 | 0.63 |
| EX1 F | 4% 380, 8% 670 | 0.997 | 93.5 | 98.5 | 86.2 | 43.1 | 1.28 |

After locating the reactor in which phase inversion was occurring for each sample, adjustments in agitator speed for that reactor were made to keep the RPS between 1 and 1.3 micron. Further, RPS span was less than 1 for all samples, and reached below 0.7 at its lowest. Low RPS span can predict consistent results for a HIPS composition. Note that Samples A-C and E-F used rubber in a PB:SB copolymer ratio of 1:2. Sample D, however, used rubber in a PB:SB copolymer ratio of 2:1, which formulation is more economical, as it reduces the need for the relatively expensive SB copolymer. Samples were extruded into a 0.060" by 3.35" by 3.35" sheet and stretched at 120° C. and 150° C., respectively, at 30 sec. preheat time, a 2×2 stretch ratio, and a 15 m/min stretch rate, to test for gloss retention.

Example 2

A sample of a HIPS composition was produced and tested for impact strength and gloss. The feed included styrene monomer and 12 wt % rubber. 171 ppm of an initiator, L233, was used, as well as 217 ppm NDM. The rubber phase included polybutadiene rubber and SB copolymer, in a PB:SB copolymer ratio of 1:2. PB rubber was Buna CB 565, commercially available from Lanxess. The SB copolymer was Solprene 1322, a 70/30 B/S tapered block with 22% block styrene. The following table lists the results for this sample.

TABLE 3

Rubber compositions and physical properties for compositions of Example 2.

| Rubber Used | 8% S-1322 + 4% Buna 565T |
|---|---|
| Gloss, 20° | 67.7 |
| Gloss, 60° | 95.5 |
| Mw | 182243 |
| Mn | 73146 |
| Flexural Modulus | 3.00E+05 |
| Flexural Strength | 6868 |
| Tensile Modulus | 2.65E+05 |
| Tensile Strength @ Yield | 3782 |
| Tensile Strength @ Break | 3176 |
| Tensile @ Max | 3782 |
| Swell Index | 12.73 |
| Gel Content | 23.52 |
| Gel/rubber | 2.6 |
| Elongation @ Yield | 1.64 |
| Elongation @ Break | 71.2 |
| RPS, microns | 1.26 |
| RPS span | 0.893 |
| Izod Impact-Notched | 2.81 |
| Gardner Dart | 248.3 |

Example 3

Several samples of HIPS composition were produced and tested for impact strength, elongation, and other physical properties. The feed included styrene monomer and from 12 wt % to 16 wt % rubber. 300 ppm of an initiator, Luperox TAEC, was used, as well as 200 ppm NDM. The rubber phase included either SB copolymer alone or polybutadiene rubber and SB copolymer. PB rubber was Buna CB 565, commercially available from Lanxess. The SB copolymer was either Solprene 1322, a 70/30 B/S tapered block with 22% block styrene, or Solprene 1430, a 60/40 B/S tapered block with 30% block styrene. The following table lists the rubber packages used in each of the experimental samples, as well as physical properties.

TABLE 4

Rubber packages and physical properties for compositions of Example 3.

| Sample | EX3 A | EX3 B | EX3 C | EX3 D | EX3 E |
|---|---|---|---|---|---|
| Rubber Composition | 12% S-1322 | 10% S-1322 + 4% 565 | 10% S-1322 + 5% 565 | 10% S-1322 + 6% 565 | 10% S-1430 + 5% 565 |
| Ratio Block/PB | — | 2.5 | 2.0 | 1.7 | 2.0 |
| Morphology | Core-shell | Salami | Salami | Salami | Salami |
| RPS, microns | 0.30 | 0.77 | 0.78 | 0.89 | 0.73 |
| % Particles <1.0 micron | 99 | 69 | 67 | 60 | 71 |
| Swell Index | 16.3 | 12.2 | 11.8 | 10.8 | 12.1 |
| % Gels | 20.3 | 25.7 | 28.4 | 30.6 | 26.9 |
| Gel/rubber | 2.4 | 2.5 | 2.4 | 2.4 | 2.5 |
| % Elong @ fail | 33 | 25 | 24 | 37 | 34 |
| Izod | 0.50 | 2.0 | 3.4 | 3.2 | 2.0 |

The data in Table 4 demonstrates how the ratio of PB to SB copolymer affects physical properties of HIPS. Greater amounts of PB relative to SB copolymer tend to increase RPS and impact properties, while decreasing gloss. Also demonstrated is how the combination of PB with SB copolymer results in salami morphology.

Example 4

Several samples of HIPS were produced and tested. The feed included styrene monomer and 10.5 wt % rubber. Reactions were carried out in the presence of 170 PPM of L-233 and 250 PPM of NDM at the following temperature profile: 75 minutes at 110° C., 60 minutes at 130° C., and 45 minutes at 150° C. Samples were devolatilized for 30 minutes at 230° C. at 0.05 Torr. All the formulations contained 1.4% mineral oil based on the initial feed. The rubber phase included polybutadiene rubber and SB copolymer. PB rubber was either Buna CB 565, commercially available from Lanxess. The SB copolymer was either Solprene 1322, a 70/30 B/S tapered block with 22% block styrene; Finaprene 411, a radial SBS triblock with 30% block styrene; or Finaprene 414, a radial SBS triblocks with 40% block styrene. The following table lists the rubber packages used in each of the experimental batches, as well as results for morphology and other physical properties.

TABLE 5

Rubber packages and physical properties for compositions of Example 4.

| Sample | Rubber Composition | Tan delta & Tg | Morphology |
|---|---|---|---|
| EX4 A | 7% S-1322, 3.5% 565 | 0.056 @ −88° C. | Primarily single core shell |
| EX4 B | 7% F-411, 3.5% 565 | 0.071 @ −87° C. | Cell structure large occlusions |
| EX4 C | 7% F-414, 3.5% 565 | 0.037 @ −90° C. | Rods or threads |
| EX4 D | 3.5% S-1322, 3.5% F-414, 3.5% 565 | 0.034 @ −94° C. | Mixed core-shell & threads |
| EX4 E | 3.5% S-1322, 3.5% F-411, 3.5% 565 | 0.070 @ −87° C. | Cell structure large occlusions |
| EX4 F | 5.0% S-1322, 2% F-411, 3.5% 565 | 0.057 @ −89° C. | Mixed core shell & cells |
| EX4 G | 5.0% S-1322, 2% F-414, 3.5% 565 | 0.045 @ −90° C. | Primarily single core shell |

The high Tan delta values for samples B and E suggest that they would have high rubber phase volume and good impact properties. FIG. 1 shows a TEM image of sample E. The morphology is cell or salami type with large occlusions. Large occlusions in a cell can be an efficient use of rubber.

Example 5

Several samples of HIPS composition were produced and tested for impact strength and gloss. The feed included styrene monomer and from 13 to 16 wt % rubber. Reactions were carried out in the presence of 300 ppm of TAEC and 300 PPM of NDM. The formulations contained 1.75% mineral oil based on the initial feed. The rubber phase included a combination of polybutadiene rubber and SB copolymer, or SB copolymer only. PB rubber was Buna CB 565, commercially available from Lanxess. The SB copolymer was either Solprene 1322, a 70/30 B/S tapered block with 22% block styrene; Solprene 1430, a 60/40 B/S tapered block with 30% block styrene; or Solprene 1110, a 85/15 random block copolymer with 10% block styrene. The following table lists the rubber packages used in each of the experimental samples, as well as results for morphology and other physical properties.

TABLE 6

Rubber packages and physical properties for compositions of Example 5.

| Sample | Rubber Composition | Gloss, 20° | Gloss, 60° | Izod, ft-lb/in | RPS, microns |
|---|---|---|---|---|---|
| EX5 A | 10% S-1430, 5% 565 | 73.4 | 91.9 | 2.69 | 1.08 |
| EX5 B | 10% S-1430, 4% 565 | 62.1 | 89.1 | 2.07 | 1.29 |
| EX5 C | 7.5% S-1110, 7.5% S-1322 | 75.1 | 93.1 | 3.34 | 0.81 |

The swell index of high impact polystyrene is determined as the ratio of weight of the swollen gel (extracted with toluene) to the weight of the dried gel. The gel content is determined as dried weight of the gel (after toluene extraction of the polystyrene sample) divided by the total weight of the sample. It is usually reported as a percentage.

Test Standards and Notes:
NDM refers to n-dodecyl mercaptan
Molecular Weights tested by ASTM D-5296
Gardner Drop, or Gardner Impact, tested by ASTM D-3029
Gloss tested by ASTM D-523
Izod Impact tested by ASTM D-256
Melt Flow tested by ASTM D-1238
Tensile Properties such as % Elongation tested by ASTM D-638
Flexural Properties such as Flexural Modulus tested by ASTM D-790
The Rubber Particle Size in microns (μm) measured from a Malvern 2000 analyzer with methyl ethyl ketone as solvent.
Swell Index and Gel Content are described herein and in U.S. Pat. No. 4,777,210 which is incorporated by reference in its entirety.
Rubber Particle Span is determined by the relationship of the average particle diameters (D90−D10)/D50.
All testing performed by ASTM standards unless specified otherwise.

As used herein, the phrase "high izod" refers to an Izod impact strength of 1.8 ft-lb/in or more.

As used herein, the phrase "high gloss" refers to a 60 degree gloss of 90 or more.

Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Also, it is within the scope of this disclosure that the aspects and embodiments disclosed herein are usable and combinable with every other embodiment and/or aspect disclosed herein, and consequently, this disclosure is enabling for any and all combinations of the embodiments and/or aspects disclosed herein. Other and further embodiments, versions and examples of the invention may be devised without departing from the basic scope thereof and the scope thereof is determined by the claims that follow.

What is claimed is:

1. A high impact polystyrene composition comprising at least 70 wt % styrene polymer and from 3 to 20 wt % of an elastomeric component, wherein the elastomeric component comprises polybutadiene and styrene butadiene copolymer, and wherein the average rubber particle span is less than 1.

2. The composition of claim 1, wherein the polybutadiene and styrene butadiene copolymer are used in a PB:SB copolymer ratio of from 2.5:1 to 0.4:1.

3. The composition of claim 1, wherein the polybutadiene and styrene butadiene copolymer are used in a PB:SB copolymer ratio of from 2:1 to 0.5:1.

4. The composition of claim 1, comprising from 8 to 20 wt % of the elastomeric component.

5. The composition of claim 1, comprising from 8 to 16 wt % of the elastomeric component.

6. The composition of claim 1, wherein the high impact polystyrene displays salami morphology.

7. The composition of claim 1, wherein the Izod impact strength of the high impact polystyrene composition is at least 1.8 ft-lbs/in.

8. The composition of claim 1, wherein the Izod impact strength of the high impact polystyrene composition is at least 2.0 ft-lbs/in.

9. The composition of claim 1, wherein the Izod impact strength of the high impact polystyrene composition is at least 2.3 ft-lbs/in.

10. The composition of claim 1, wherein the gloss at 60 degrees of the high impact polystyrene composition is at least 90.

11. The composition of claim 1, wherein the gloss at 20 degrees of the high impact polystyrene composition is at least 60.

12. The composition of claim 1, wherein the Gardner drop of the high impact polystyrene composition is at least 10 in-lb.

13. The composition of claim 1, wherein the Gardner drop of the impact polystyrene composition is at least 50 in-lb.

14. The composition of claim 1, wherein the Gardner drop of the high impact polystyrene composition ranges from 150 to 350 in-lb.

15. The composition of claim 1, wherein the elongation at break of the high impact polystyrene composition ranges from 50 to 90%.

16. The composition of claim 1, wherein the styrene butadiene copolymer is a diblock copolymer comprising from 10 to 45 wt % styrene.

17. The composition of claim 1, wherein the styrene butadiene copolymer is a diblock copolymer comprising from 5 to 35 wt % styrene present as styrene block.

18. The composition of claim 1, wherein the styrene butadiene copolymer is a triblock copolymer comprising from 30 to 40 wt % styrene block.

19. The composition of claim 1, further comprising from 100 to 500 ppm of a chain transfer agent.

\* \* \* \* \*